US012344528B2

(12) United States Patent
Chien

(10) Patent No.: US 12,344,528 B2
(45) Date of Patent: Jul. 1, 2025

(54) METHOD AND SYSTEM FOR CONVERTING RAW COAL POWDER INTO POLYCRYSTALLINE NANO-GRAPHITE BY METAL-ASSISTED MICROWAVE TREATMENT

(71) Applicant: University of Wyoming, Laramie, WY (US)

(72) Inventor: TeYu Chien, Laramie, WY (US)

(73) Assignee: University of Wyoming, Laramie, WY (US)

( * ) Notice: Subject to any disclaimer, the term of this patent is extended or adjusted under 35 U.S.C. 154(b) by 0 days.

(21) Appl. No.: 17/745,643

(22) Filed: May 16, 2022

(65) Prior Publication Data
US 2022/0363547 A1 Nov. 17, 2022

Related U.S. Application Data

(60) Provisional application No. 63/189,282, filed on May 17, 2021.

(51) Int. Cl.
| | |
|---|---|
| C01B 32/205 | (2017.01) |
| B01J 6/00 | (2006.01) |
| C01G 3/02 | (2006.01) |

(52) U.S. Cl.
CPC ............ C01B 32/205 (2017.08); B01J 6/008 (2013.01); C01G 3/02 (2013.01); C01P 2002/82 (2013.01);
(Continued)

(58) Field of Classification Search
CPC .......... C01B 32/205; B01J 6/008; C01G 3/02; C01P 2002/82; C01P 2004/03; C01P 2004/04
(Continued)

(56) References Cited

FOREIGN PATENT DOCUMENTS

CN 103771403 A * 5/2014

OTHER PUBLICATIONS

Pang, Fei. "A compact microwave plasma enhanced chemical vapor deposition based on a household microwave oven". Review of Scientific Instruments 89, 086104 (2018) (Year: 2018).*
(Continued)

*Primary Examiner* — Coris Fung
*Assistant Examiner* — Catriona M Corallo
(74) *Attorney, Agent, or Firm* — Goodhue, Coleman & Owens, P.C.

(57) ABSTRACT

A metal-assisted microwave treatment that converts raw coal powders into nano-graphite is presented. Specifically, four major factors are identified for successful conversion: (1) high temperature; (2) reducing environment; (3) catalyst; and (4) microwave radiation. Specifically, it is determined that the combination of the carbon sources (raw coal powders), the high temperature (microwave induced electric sparking), the reducing environment (the $Ar/H_2$ mixture), the catalyst (Cu foil), with the microwave radiations can generate nano-graphite. This novel approach utilizes the sparking induced by the microwave radiation on the fork-shape metal foils to generate high temperature (>1000° C.) within few seconds. The small thermal load makes this method cost effective and has potential for higher temperature using metals with higher melting temperature. Refinement of this technique is possible to yield a higher quality and quantity of nano-graphite materials for a wider range of applications.

22 Claims, 19 Drawing Sheets

(52) U.S. Cl.
CPC ...... *C01P 2004/03* (2013.01); *C01P 2004/04* (2013.01)

(58) Field of Classification Search
USPC .......................................................... 423/448
See application file for complete search history.

(56) References Cited

OTHER PUBLICATIONS

A.O. Basheer, Y. Al-Douri, Z.Z. Chowdhury, Chemical processes of metal oxide powders, in: Metal Oxide Powder Technologies, INC, 2020, pp. 189-208.

A.S. Mahmood, R.A. Al-Samarai, Y. Al-Douri, Metal oxides powder technology in energy technologies, in: Metal Oxide Powder Technologies, INC, 2020, pp. 253-262.

B.J. Cardott, M.E. Curtis, Identification and nanoporosity of macerals in coal by scanning electron microscopy, Int. J. Coal Geol. 190 (2018) 205-217.

C. Xia, T. Wiltowski, S. Harpalani, Y. Liang, Coal depolymerization using permanganate under optimal conditions, Int. J. Coal Geol. 168 (2016) 214-221.

C.-G. Lee, Y.-J. Hwang, Y.-M. Choi, J.-K. Lee, C. Choi, J.-M. Oh, A study on the tribological characteristics of graphite hano lubricants, Int. J. Precis. Eng. Manuf. 10 (2009) 85-90.

C.H. Voon, K.L. Foo, B.Y. Lim, S.C.B. Gopinath, Y. Al-Douri, Synthesis and preparation of metal oxide powders, in: Metal Oxide Powder Technologies, INC, 2020, pp. 31-65.

D. Kondo, S. Sato, K. Yagi, N. Harada, M. Sato, M. Nihei, N. Yokoyama, Low-temperature synthesis of graphene and fabrication of top-gated field effect transistors without using transfer processes, Appl. Phys. Express 3 (2010) 025102.

D. Voiry, J. Yang, J. Kupferberg, R. Fullon, C. Lee, H.Y. Jeong, H.S. Shin, M. Chhowalla, High-quality graphene via microwave reduction of solution-exfoliated graphene oxide, Science 353 (2016) 1413-1416.

D.D.L. Chung, Electrical applications of carbon materials, J. Mater. Sci. 39 (2004) 2645-2661.

D.D.L. Chung, Review exfoliation of graphite, J. Mater. Sci. 22 (1987) 4190-4198.

D.E. Starr, E.M. Pazhetnov, A.I. Stadnichenko, A.I. Boronin, S.K. Shaikhutdinov, Carbon films grown on Pt(111) as supports for model gold catalysts, Surf. Sci. 600 (2006) 2688-2695.

D.G. Ponte, I.F. Prieto, P.F. Viar, J.C.G. Luengo, Determination of moisture content in power station coal using microwaves, Fuel 75 (1996) 133-138.

E. Lester, S. Kingman, The effect of microwave pre-heating on five different coals, Fuel 83 (2004) 1941-1947.

E.T. Thostenson, T.-W. Chou, Microwave processing: Fundamentals and applications, Compos. Part A 30 (1999) 1055-1071.

F. Ahmad, Y. Al-Douri, D. Kumar, S. Ahmad, Metal-oxide powder technology in biomedicine, in: Metal Oxide Powder Technologies, INC, 2020, pp. 121-168.

F. Liu, M.H. Jang, H.D. Ha, J.H. Kim, Y.H. Cho, T.S. Seo, Facile synthetic method for pristine graphene quantum dots and graphene oxide quantum dots: Origin of blue and green luminescence, Adv. Mater. 25 (2013) 3657-3662.

G. Ruan, Z. Sun, Z. Peng, J.M. Tour, Growth of graphene from food, insects and waste, ACS Nano 5 (2011) 7601-7607.

H. Ago, Y. Ito, N. Mizuta, K. Yoshida, B. Hu, C.M. Orofeo, M. Tsuji, K. Ikeda, S. Mizuno, Epitaxial chemical vapor deposition growth of single-layer graphene over, ACS Nano 4 (2010) 7407-7414.

H. Ueta, M. Saida, C. Nakai, Y. Yamada, M. Sasaki, S. Yamamoto, Highly oriented monolayer graphite formation on Pt (111) by a supersonic methane beam, Surf. Sci. 560 (2004) 183-190.

H. Zhu, X. Wang, Y. Li, Z. Wang, F. Yang, X. Yang, Microwave synthesis of fluorescent carbon nanoparticles with electrochemiluminescence properties, Chem. Commun. (2009) 5118-5120.

J. Bai, X. Liao, E. Huang, Y. Luo, Q. Yang, G. Li, Control of the cell structure of microcellular silicone rubber/nanographite foam for enhanced mechanical performance, Mater. Des. 133 (2017) 288-298.

J. Coraux, A.T. N'Diaye, C. Busse, T. Michely, Structural coherency of graphene on Ir(111), Nano Lett. 8 (2008) 565-570.

J. Hilman, A.J. Yost, J. Tang, B. Leonard, T. Chien, Low temperature growth of cuo nanowires through direct oxidation, Nano-Struct. Nano-Objects 11 (2017) 124-128.

J.P. Mathews, A.L. Chaffee, The molecular representations of coal—a review, Fuel 96 (2012) 1-14.

K. Hernadi, A. Fonseca, J.B. Nagy, D. Bernaerts, A.A. Lucas, Fe-catalyzed carbon nanotube formation, Carbon N. Y 34 (1996) 1249-1257.

Lu, V. Sahajwalla, C. Kong, D. Harris, Quantative X-ray diffraction analysis and its application to various coals, Carbon N. Y 39 (2001) 1821-1833.

L. Tang, R. Ji, X. Li, K.S. Teng, S.P. Lau, Size-dependent structural and optical characteristics of glucose-derived graphene quantum dots, Part. Part. Syst. Charact. 30 (2013) 523-531.

L. Tonelli, L. Pezzato, P. Dolcet, M. Dabalà, C. Martini, Effects of graphite nano-particle additions on dry sliding behaviour of plasmaelectrolyticoxidation-treated EV31a magnesium alloy against steel in air, Wear 404-405 (2018) 122-132.

L.S.K. Pang, M.A. Wilson, Nanotubes from coal, Energy Fuels 7 (1993) 436-437.

M.S. Dresselhaus, G. Dresselhaus, New directions in intercalation research, Mol. Cryst. Liq. Cryst. 244 (1994) 1-12.

M.S. Seehra, A. Kalra, A. Manivannan, Dewatering of fine coal slurries by selective heating with microwaves, Fuel 86 (2007) 829-834.

N. Standish, H.K. Worner, H.R. Kaul, Microwave drying of brown coal agglomerates, J. Microw. Power Electromagn. Energy 23 (1988) 171-175.

N.G. Cutmore, T.G. Evans, A.J. McEwan, C.A. Rogers, S.L. Stoddard, Low frequency microwave technique for on-line measurement of moisture, Miner. Eng. 13 (2000) 1615-1622.

P.E. Nolan, M.J. Schabel, D.C. Lynch, A.H. Cutler, Hydrogen control of carbon deposit morphology, Carbon N. Y 33 (1995) 79-85.

R.A. Al-Samarai, A.S. Mahmood, Y. Al-Douri, Surface modification, including polymerization, nanocoating, and microencapsulation, in: Metal Oxide Powder Technologies, vol. 2, INC, 2020, pp. 83-99.

R.M. Perkin, The heat and mass transfer characteristics of boiling point drying using radio frequency and microwave electromagnetic fields, Int. J. Heat Mass Transf. 23 (1980) 687-695.

S. Amelinckx, X.B. Zhang, D. Bernaerts, X.F. Zhang, V. Ivanov, J.B. Nagy, A formation mechanism for catalytically grown helix-shaped graphite nanotubes, Science 265 (1994) 635-639.

S. Marland, B. Han, A. Merchant, N. Rowson, The effect of microwave radiation on coal grindability, Fuel 79 (2000) 1283-1288.

T.X. Phuoc, P. Wang, D. McIntyre, Detection of rare earth elements in powder river basin sub-bituminous coal ash using laser-induced breakdown spectroscopy (LIBS), Fuel 163 (2016) 129-132.

V. Ivanov, J.B. Nagy, P. Lambin, A. Lucas, X.B. Zhang, X.F. Zhang, D. Bernaerts, G. VanTendeloo, S. Amelinckx, J. VanLanduyt, The study of carbon nanotubes produced by catalytic method, Chem. Phys. Lett. 223 (1994) 329-335.

W.K. Ahmed, Y. Al-Douri, Three-dimensional printing of ceramic powder technology, in: Metal Oxide Powder Technologies, INC, 2020, pp. 351-383.

X. Ma, M. Zhang, F. Min, Study of enhanced low-quality coal oxidative desulphurization and deashing by using HNO3 and microwave pretreatment, Environ. Technol. 35 (2014) 36-41.

Y. Al-Douri, A.O. Basheer, Production of powder-activated carbon from natural resources, in: Nanoparticles in Analytical and Medical Devices, INC, 2021, pp. 277-299.

Y. Al-Douri, S.A. Abdulateef, A.A. Odeh, C.H. Voon, N. Badi, Gano colloidal nanoparticles synthesis by nanosecond pulsed laser ablation: Laser fluence dependent optical absorption and structural properties, Powder Technol. 320 (2017) 457-461.

(56) References Cited

OTHER PUBLICATIONS

Y. Al-Douri, Y.A. Wahab, N.A. Hamizi, Physical studies of metal oxide powders, in: Metal Oxide Powder Technologies, INC, 2020, pp. 1-15.

Y.A. Wahab, S. Fatmadiana, M.N. Naseer, M.R. Johan, N.A. Hamizi, S. Sagadevan, O. Akbarzadeh, Z.Z. Chowdhury, T. Sabapathy, Y. AlDouri, Metal oxides powder technology in dielectric materials, in: Metal Oxide Powder Technologies, INC, 2020, pp. 385-399.

A. Reina, X. Jia, J. Ho, D. Nezich, H. Son, V. Bulovic, M.S. Dresselhaus, J. Kong, Large area, few-layer graphene films on arbitrary substrates by chemical vapor deposition, Nano Lett. 9 (2009) vol. 9, 30-35.

A. Thess, R. Lee, P. Nikolaev, H. Dai, P. Petit, J. Robert, C. Xu, YH. Lee, SG. Kim, AG. Rinzler, D.T. Colbert, G.E. Scuseria, D. Tomanek, J.E. Fischer, R.E. Smalley, Crystalline ropes of metallic carbon nanotubes, Science 273 (1996) 483-488.

A.A. Odeh, Y. Al-Douri, Metal oxides in electronics, in: Metal Oxide Powder Technologies, INC, 2020, pp. 263-278.

B. Logan, S. Cheng, V. Watson, G. Estadt, Graphite fiber brush anodes for increased power production in air-cathode microbial fuel cells, Environ. Sci. Technol. 41 (2007) 3341-3346.

B.D. Keller, N. Ferralis, J.C. Grossman, Rethinking coal: Thin films of solution processed natural carbon nanoparticles for electronic devices, Nano Lett. 16 (2016) 2951-2957.

B.J. Kang, J.H. Mun, C.Y. Hwang, B.J. Cho, Monolayer graphene growth on sputtered thin film platinum, J. Appl. Phys. 106 (2009) 104309.

C. Journet, W.K. Maser, P. Bernier, A. Loiseau, M. Lamy de la Chapelle, S. Lefrant, P. Deniard, R. Lee, J.E. Fischer, Large-scale production of singlewalled carbon nanotubes by the electric-arc technique, Nature 388 (1997) 756-758.

C. Li, Y. Dong, J. Yang, Y. Li, C. Huang, Modified nano-graphite/ Fe3O4 composite as efficient adsorbent for the removal of methyl violet from aqueous solution, J. Mol. Liq. 196 (2014) 348-356.

D.G. Levine, R.H. Schlosberg, B.G. Silbernagel, Understanding the chemistry and physics of coal structure (a review), Proc. Natl. Acad. Sci. 79 (1982) 3365-3370.

G.H. Taylor, J.D.F. Gerald, L. Pang, M.A. Wilson, Cathode deposits in fullerene formation—microstructural evidence for independent pathways of pyrolytic carbon and nanobody formation, J. Cryst. Growth 135 (1994) 157-164.

K. Kashimura, S. Suzuki, M. Hayashi, T. Mitani, N. Shinohara, K. Nagata, Surface-plasmon-like modes of graphite powder compact in microwave heating, J. Appl. Phys. 112 (2012) 034905.

K. Moothi, S.E. Iyuke, M. Meyyappan, R. Falcon, Coal as a carbon source for carbon nanotube synthesis, Carbon N. Y 50 (2012) 2679-2690.

K. Persson, Y. Hinuma, Y.S. Meng, A. Van derVen, G. Ceder, Thermodynamic and kinetic properties of the li-graphite system from first-principles calculations, Phys. Rev. B 82 (2010) 125416.

K. Williams, M. Tachibana, J. Allen, L. Grigorian, S.-C. Cheng, S.L. Fang, G.U. Sumanasekera, A.L. Loper, J.H. Williams, P.C. Eklund, Single-wall carbon nanotubes from coal, Chem. Phys. Lett. 310 (1999) 31-37.

K.S. Kim, Y. Zhao, H. Jang, S.Y. Lee, J.M. Kim, K.S. Kim, J.H. Ahn, P. Kim, J.Y. Choi, B.H. Hong, Large-scale pattern growth of graphene films for stretchable transparent electrodes, Nature 457 (2009) 706-710.

L.S.K. Pang, A.M. Vassallo, M.A. Wilson, Fullerenes from coal, Nature 352 (480) (1991).

P.W. Sutter, J.I. Flege, E.A. Sutter, Epitaxial graphene on ruthenium, Nat. Mater. 7 (2008) 406-411.

Q. Yu, J. Lian, S. Siriponglert, H. Li, Y.P. Chen, S.S. Pei, Graphene segregated on Ni surfaces and transferred to Insulators, Appl. Phys. Lett. 93 (2008) 113103.

R. Bhima Rao, N. Patnaik, Preparation of high pure graphite by alkali digestion method, Scand. J. Metall. 33 (2004) 257-260.

R. Ye, C. Xiang, J. Lin, Z. Peng, K. Huang, Z. Yan, N.P. Cook, E.L.G. Samuel, C.-C. Hwang, G. Ruan, et al., Coal as an abundant source of graphene quantum dots, Nat. Commun. 4 (2013) 2943.

S. Chehreh Chelgani, M. Rudolph, R. Kratzsch, D. Sandmann, J. Gutzmer, A review of graphite beneficiation techniques, Miner. Process. Extr. Metall. Rev. 37 (2016) 58-68.

S. Singh, V.B. Neculaes, V. Lissianski, G. Rizeq, S.B. Bulumulla, R. Subia, J. Manke, Microwave assisted coal conversion, Fuel 140 (2015) 495-501.

S.F. Bartolucci, J. Paras, M.A. Rafiee, J. Rafiee, S. Lee, D. Kapoor, N. Koratkar, Graphene-aluminum hanocomposites, Mater. Sci. Eng. A 528 (2011) 7933-7937.

T. Shimada, T. Sugai, C. Fantini, M. Souza, L.G. Cançado, A. Jorio, M.A. Pimenta, R. Saito, A. Grüneis, G. Dresselhaus, et al., Origin of the 2450 cm-1 Raman bands in HOPG, single-wall and double-wall carbon nanotubes, Carbon N. Y 43 (2005) 1049-1054.

W.H. Qu, Y.B. Guo, W.Z. Shen, W.C. Li, Using asphaltene supermolecules derived from coal for the preparation of efficient carbon electrodes for supercapacitors, J. Phys. Chem. C 120 (2016) 15105-15113.

X. Li, W. Cai, J. An, S. Kim, J. Nah, D. Yang, R. Piner, A. Velamakanni, I. Jung, T. Emanuel, et al., Large area synthesis of high-quality and uniform graphene films on copper foils, Science 324 (2009) 1312-1314.

Y. Sun, S. Wang, C. Li, P. Luo, L. Tao, Y. Wei, G. Shi, Large scale preparation of graphene quantum dots from graphite with tunable fluorescence properties, Phys. Chem. Chem. Phys. 15 (2013) 9907-9913.

\* cited by examiner

METHOD AND SYSTEM FOR CONVERTING RAW COAL POWDER INTO POLYCRYSTALLINE NANO-GRAPHITE BY METAL-ASSISTED MICROWAVE TREATMENT

PRIORITY STATEMENT

This application claims priority to Application No. 63/189,282, titled Method And System For Converting Raw Coal Powder Into Polycrystalline Nano-Graphite By Metal-Assisted Microwave Treatment, filed on May 17, 2021, all of which are hereby incorporated by reference in its entirety.

GRANT REFERENCE

This invention was made with government support under Grant 1710512 awarded by the National Science Foundation. The government has certain rights in the invention.

BACKGROUND

I. Field of the Disclosure

The present disclosure relates to the conversion of carbon sources into higher valve materials. Particularly, but not exclusively, the present disclosure relates converting a carbon source into a higher value material by metal-assisted microwave treatment.

II. Description of the Prior Art

Graphene oxides produced through a modified Hummers' method on graphite were successfully reduced to high quality graphene via microwave treatment where the graphite is dissolved into different solvents prior to receiving microwave. These reported methods utilize microwaves as a method of fast energy transfer with dielectric absorption. The existing methods of converting coal into higher value materials require specific pre-treatments prior to the microwave treatment and resulting in other various end products. What is needed is a one-step conversion process with no pretreatment.

SUMMARY

Therefore, it is a primary object, feature, or advantage of the present disclosure to improve over the state of the art.

It is an object, feature, or advantage of the present disclosure that the conversion process does not require pretreatment.

It is a still further object, feature, or advantage of the present disclosure to induce sparking and high temperatures by microwave irradiation.

Another object, feature, or advantage is to convert coal to graphite using a microwave oven.

Yet another object, feature, or advantage is using a simple and inexpensive coal-conversion technology to convert coal to graphite.

Yet another object, feature, or advantage is using a one-step method with metal-assisted microwave treatment.

Yet another object, feature, or advantage is using high temperatures, copper foil, and gas to transform coal powder into polycrystalline graphite.

According to at least one exemplary aspect, a method for converting carbon into a higher value material is disclosed. The method may include shaping a metal catalyst foil, wherein the shape of the metal catalyst foil has at least one point. The method may include placing a carbon source onto the metal catalyst foil and sealing the carbon source and metal catalyst foil in a container. The method may further include microwaving the container. The microwaving may induce sparking at the metal catalyst foil. The microwaving may increase the temperature of an inside of the sealed container. The method also may include converting the carbon source into a higher value material, wherein the higher value material may include a metal oxide or graphite, cooling the metal catalyst foil, and removing the higher value material from the metal catalyst foil.

According to another exemplary aspect a system for converting a carbon source into a higher value material is disclosed. The system may include a carbon source and a metal catalyst foil. The metal catalyst foil can be configured to be shaped to induce sparking and the carbon source is placed on the metal catalyst foil. The system may further include a sealed container for housing the metal catalyst foil and the carbon source and a microwave radiation machine for supplying microwave radiation at the metal catalyst foil. The microwave radiation may induce sparking on the metal catalyst foil. The microwave radiation and sparking may convert the carbon source into graphite or a metal oxide.

According to another exemplary aspect a system converting carbon into graphite is disclosed, and the system may include a carbon source. The carbon source may include at least one of coal and plastic. The system may also include a shaped metal foil. The shaped metal foil may have a plurality of points and wherein the carbon source may be placed on at least one of the plurality of points. The system may further include a container having a reducing environment and configured to hold the shaped metal foil and the carbon source placed on the at least one of the plurality of points. The system may further include a microwave irradiation machine configured to produce radiation, wherein the container housing the shaped metal foil and the carbon source may be placed in the microwave. The microwave irradiation may induce sparks at the metal foil and the sparking and microwave radiation convert the carbon source into graphite.

One or more of these and/or other objects, features, or advantages of the present disclosure will become apparent from the specification and claims that follow. No single aspect need provide every object, feature, or advantage. Different aspects may have different objects, features, or advantages. Therefore, the present disclosure is not to be limited to or by any objects, features, or advantages stated herein.

BRIEF DESCRIPTION OF THE DRAWINGS

Illustrated aspects of the disclosure are described in detail below with reference to the attached drawing figures, which are incorporated by reference herein, and where.

DETAILED DESCRIPTION

Figure 1A:
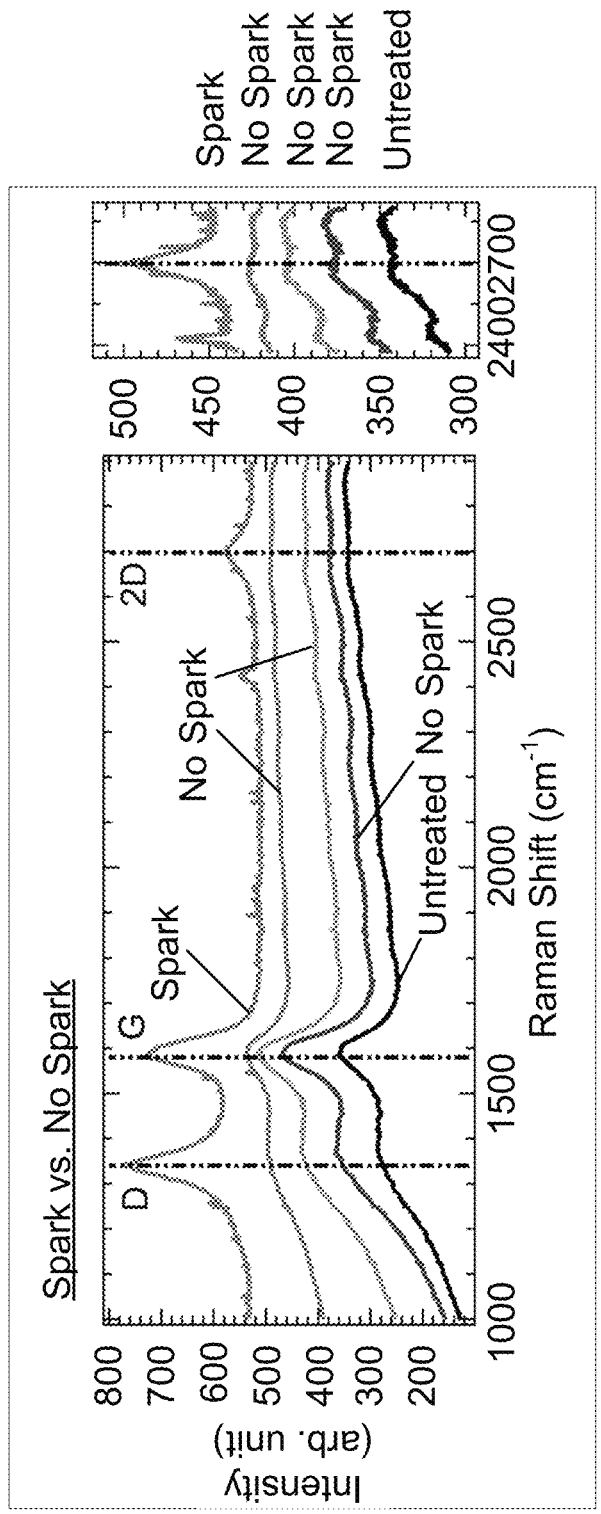
FIGS. 1A-1C provide pictorial illustrations for Raman spectra taken on samples with various conditions in accordance with an exemplary aspect of the present disclosure.

This disclosure relates to the conversion of raw coal powder or other carbon materials, such as waste plastic powder, into higher value materials, such as nano graphite. The method is composed of five main factors: microwave radiation (such as 900 W, 2.54 GHz); catalytic metal foil (such as a copper, Cu, foil); high temperature (achieved by the induced sparks due to the microwave radiation illuminating on fork-shape metal foil); a reducing environment (such as 95% Ar and 5% $H_2$); and the to-be-converted materials (carbon source).

Coal is one of the most available carbon materials worldwide with the United States alone producing 756.2 million tons of coal in 2018. Around ninety percent of the coal is used for electricity generation through combustion, which poses concerns in climate change. While alternative energy sources are actively investigated in order to replace fossil fuels for energy generation, the abundant coal resources will face transitions toward other usages. Thus, converting coal materials into higher value materials, such as graphene, graphite, and/or carbon nanotubes, is of high interest. Among the high value carbon materials, graphite is used in a wide variety of applications, including lubricants, high-temperature gasket, non-porous sealing layers, fire extinguisher agent for metal fires, thermal insulators for molten metals, conductivity additives for electromagnetic reflectors, enhancing mechanical performance, synthesizing other carbon materials (including graphene quantum dots (GQDs)), graphite intercalation compounds (GICs), fuel cells, and lithium-ion batteries. Finite graphite reserves and environmental concerns for the graphite extraction procedures make the method of converting coal to graphite a great alternative source of graphite production.

Overall, the molecular structures of coal are complicated. The complexity of coal is twofold. First, there are no common molecular structures. Generally, simplified molecular representations contain nm or sub-nm sized crystalline carbon domains with defects that are linked by amorphous carbons. Over one hundred variants of molecular level representations of coal or coal extracts have been reported. Second, coal contains a variety of impurities, either as inorganic and organic parts in both stable and volatile states. Given the complexity, coal conversion is not a trivial task. The feasibility of preparing carbon nanomaterials from coal was first established by Pang et al. with the synthesis of $C_{60}$ and $C_{70}$. Since then, coal is considered as an important carbon source for synthesizing carbon nanotubes, and graphene quantum dots (GQDs). On the other hand, even without purifications and detail characterizations, minimally processed coal was synthesized into a thin film for a joule heating device.

Among the various methods used to convert coal into carbon materials, microwave treatments are attractive due to the low cost and high efficiency. Microwaves are electromagnetic waves with a frequency ranging from 300 MHz to 300 GHz. Two frequencies (0.915 and 2.45 GHz) are reserved by the Federal Communications Commission (FCC) for industrial, scientific, medical, and instrumentation (ISMI) purposes. Previous studies have proven microwave radiation effective in treating coal materials. For instance, microwaves were used for measuring moisture content, dewatering of coals, removing sulfur and mineral matters from coal, and converting coal into commercial fuels. Microwave treatments were also used in synthesizing carbon nanoparticles and GQDs. Similarly, graphene oxides produced through a modified Hummers' method on graphite were successfully reduced to high quality graphene via microwave treatment where the graphite is dissolved into different solvents. These reported methods utilize microwaves as a method of fast energy transfer with dielectric absorption. Yet most of them require specific pretreatment prior to the microwave treatment. Here, a one-step method with metal-assisted microwave treatment is presented for converting the carbon materials into nano-graphite. The high temperature generated by sparking induced by the microwave radiation on fork-shape metal foils is a novel approach and has great potential to be increased when higher melting point metals are used.

A variety of factors can affect the purity or yield of the higher value material or address limitations. The variety of factors can include the type or amount of the carbon source, the amount, type, composition, characteristics, shape, or thickness of the metal, the type or size of the environment, the length of the radiation, the strength of the electric field generated, the temperature of the environment, the duration of the sparking or any other factor that affects the purity or yield of the higher value material.

Materials and Characterization Methods

Figure 5:
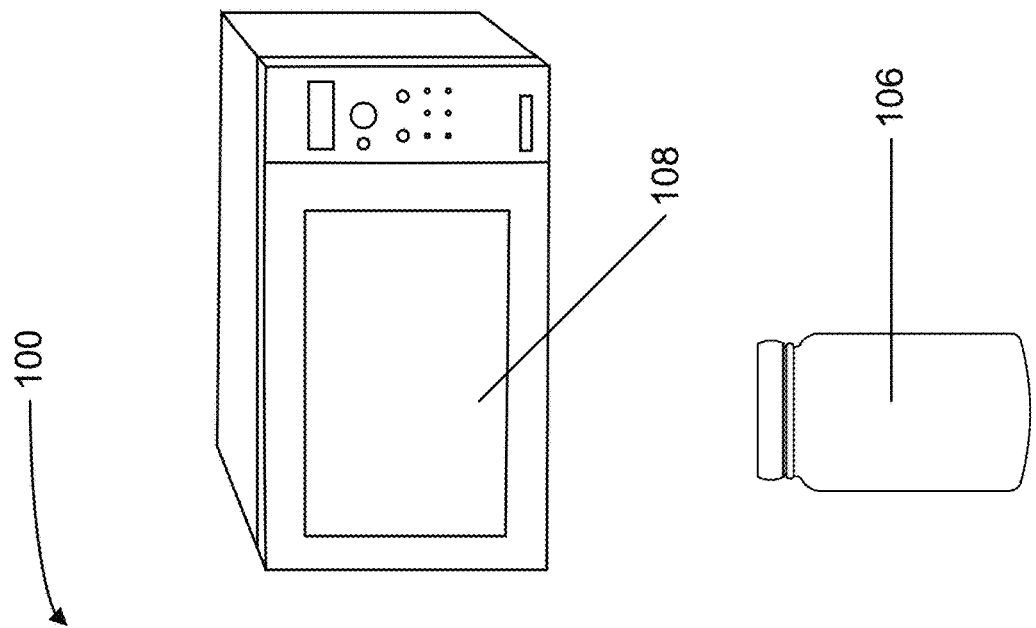
FIG. 5 is an illustration of the system for converting a carbon source into a higher value material in accordance with an exemplary aspect of the present disclosure.
Figure 5:
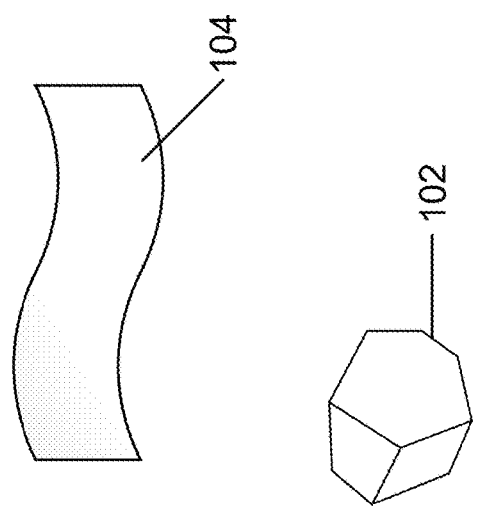

A system 100 for converting a carbon source into a higher value material may include the carbon source 102, a metal catalyst 104, a container 106 for housing the metal catalyst 104 and the carbon source, and a radiation source 108, such as a microwave 108, as shown in FIG. 5.

The type of carbon source 102 may affect the purity or yield of the higher value material. The carbon source or carbon containing compounds can include organic deposits such as coal or raw coal powder, peat, oil, diamond, carbonate sedimentary rocks, graphene oxide, methane clathrates, plastics, or plastic powder, such as grind powder, carbon dioxide, food, insects, and waste. The carbon source 102 may be finely ground into sub-millimeter grains. The carbon source 102 may be ground or pulverized into a powder.

The type, amount, characteristics, shape, or thickness of the metal catalyst 104 may affect the purity or yield of the higher value material. The metal used as a catalyst may include transition metals such as iron, cobalt, copper, platinum, nickel, silver, gold, brass, bronze, tin, steel, and other suitable transitional metals (i.e., d-block elements) selected from the periodic table. The metals may include alkali metals, alkaline earth metals, metalloids, or other metals. Some metals, such as aluminum, may have a lack of catalytic activity for graphene growth. The transition metal may be a refractory metal such as tungsten, niobium, molybdenum, tantalum, rhenium, ruthenium, iridium, osmium, rhenium, technetium, manganese, chromium, vanadium, titanium, zirconium, hafnium or other suitable refractory metals (i.e., d-block elements) selected from the periodic table. The transition metal may be a refractory metal alloy.

The metal catalyst 104 may be chosen due to specific metal characteristics. The characteristics may include melting point, thermal conductivity, electrical conductivity, catalytic properties, magnetic properties, oxidation properties, corrosive properties. In some aspects of the present disclosure, metals with a high melting point may be selected. Metals, even without catalytic properties, may have other useful effects such as a high melting point to reach higher temperatures using this method. For example, signs of Tungsten melting may be seen around ~3400° C., or ~6200° F. The thickness of the metal sheet or foil may vary. For example, the thickness of the Cu foil is 25 µm. The metal foils may be shaped to induce sparking during microwave irradiation. FIG. 1C compares the spectra of Cu (catalytic) and Al (non-catalytic) foils.

The environment the metal catalyst 104 and carbon source 102 are placed in during the conversion of the carbon source to the higher value material may affect the purity and yield of the higher value material. The environment for converting coal may be an ambient environment, an inert environment, such as argon, an oxidizing environment, or a reducing environment ($Ar/H_2$). FIG. 1B compares the spectra of three samples with these three environments: ambient, inert and reducing environments as well as the untreated raw coal. The two samples, inert environment (pure Ar) and ambient environment (air), exhibit no 2D peak, indicating that no long range ordered structure has formed. The environment may be the environment inside a container 106 or inside the radiation source 108.

The metal catalyst 104 and carbon source 102 treated in the inert environment (Ar) exhibits a similar Raman spectrum as that of the untreated coal. This infers that under the inert environment, the high temperature induced from the sparking does not alter the coal materials to have observable changes in its Raman spectra. The conversion of GO to graphene through microwave treatment may use the inert environment and does not require a reduced environment. As GO is obtained by oxidizing graphite, GO has large basal plane structures with chemisorbed functional groups. The edge stabilization is not a key procedure to convert the GO back to graphene, hence the reducing environment is not critical.

On the contrary, the metal catalyst 104 and carbon source 102 treated in the ambient environment exhibits weaker D and G bands in the Raman spectrum. The amount of the aromatic structured carbon materials is reduced after the sparking process. Coal combustion may be taking place during the sparking process in the ambient condition.

$H_2$ may stabilize the C—H bonds at the edges of the graphite layers, preventing the formation of an amorphous carbon. When converting very defective coal materials, the $Ar/H_2$ reducing environment or other reducing environment stabilizes the edges of the graphite layers to form larger size of crystalline graphite. The reducing environment may require elements with strong antioxidant tendency, such as, for example, including elements in the first and second columns (i.e., s-block elements) in the periodic table. The elements may include hydrogen, lithium, sodium, potassium, rubidium, caesium, francium, beryllium, magnesium, calcium, strontium, barium, radium, or other suitable elements. The reducing environment may use other noble gases such as helium, neon, krypton, xenon, or radon.

Similarly, while dealing with complex carbon sources, such as food, insects, and waste, the reducing environment's flow serves as both the carrier gas as well as the reducing reagent for the complex carbon compounds. The reducing environment may take place in in a sealed environment such as in a vial or it may be flowing. It is possible that the flowing $Ar/H_2$ might produce better results, such as higher quantity or better quality of the nano-graphite. In one example, a molar ratio of 95% Ar and 5% $H_2$ is used as the reducing environment. Other molar ratios may be used. In some aspects, the molar ratio may be higher or lower to safely operate the experiment. The sealed environment may be in container 106 or vials 106 such as glass vials, bottles, beakers, staccups, flasks, glove boxes, hood, glass containers, or any other container that is capable of having an airtight seal. A sealed environment may be needed to prevent oxygen and water from participating in the reaction. The sealed environment reduces the chance for the carbon materials to combine with oxygen, including, for example, reducing oxidation and combustion reactions during the process.

To supply the microwave radiation, a radiation source 108 such as a microwave oven 108 may be used, such as a conventional microwave oven or an industrial microwave oven. The microwave radiation produces sparks on the catalyst metal foil. The microwave oven 108 may have a tube passing through the microwave region. The tube allows for continuous feeding of raw materials into the microwave and continuous production of products out of the microwave while maintaining a controlled environment within the microwave. The tube may have a conveyor belt to allow the materials to pass through.

The microwave radiation may be generated from a conventional household microwave oven 108 (Hamilton Beach 900 W, 2.54 GHz). A maser may be used to amplify the microwaves using similar principles to the laser, which amplifies higher frequency light waves. Any device with a magnetron or a microwave heating system may be used to generate the microwave radiation.

The microwave treated materials were characterized with Raman Spectroscopy, Scanning Electron Microscopy (SEM), and Transmission Electron Microscopy (TEM). Raman spectroscopy was conducted using a Snowy Range Instruments Raman spectrometer with a 532 nm diode-pumped solid-state laser. SEM images were acquired using a FEI Quanta 250 with a 20 keV beam. TEM images were acquired with a FEI Tecnai G20 FE-TEM/STEM using a 200 keV beam.

Converting Procedure

Figure 6:
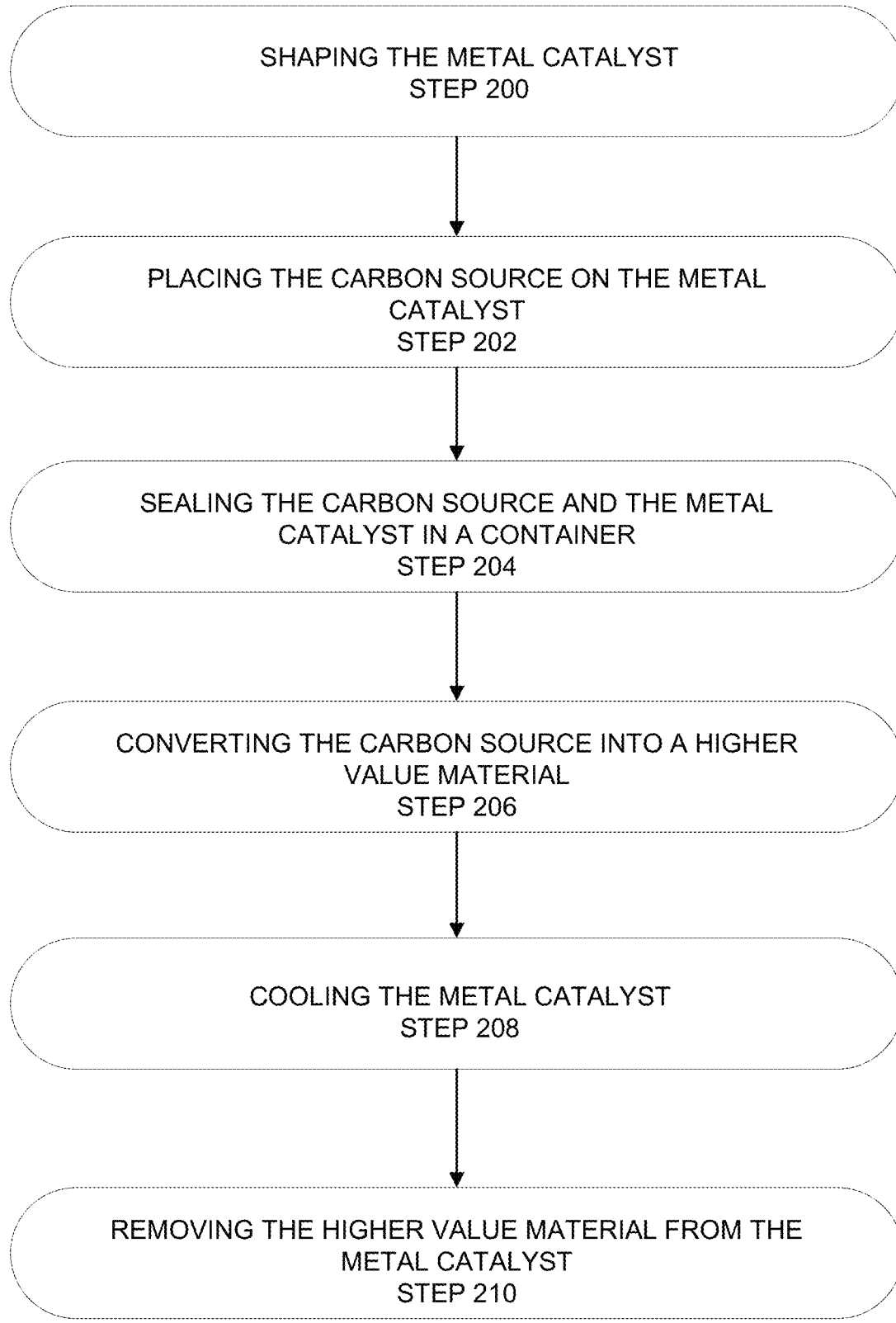
FIG. 6 is a flowchart of a method for converting a carbon source into a higher value material in accordance with an exemplary aspect of the present disclosure.

A method for converting a carbon source into a higher value material in accordance with one exemplary aspect of the disclosure is shown in FIG. 6. First, the metal catalyst may be shaped (Step 200). The shape of the metal foil may be cut with a knife, twisted into shape, bent into shape, torn into shape or may be shape by any method sufficient to shape the metal foil. Depending on the length and type of microwave radiation, the metal foils may be rectangular, such as 10 mm×20 mm×25 µm, or 10 mm×20 mm×500 µm, square, circular, triangular, have multiple points in a row or be shaped into any other shape that may induce sparking. Sharp regions, at the tip of the points, may enhance the electric field, provided by microwave radiation in this case. When a strong electric field is produced with the assistance of the sharp regions, the gas environment near the sharp regions goes through a dielectric break down and induces sparks. The sharpness of the points may depend on the selection of the metal. For example, tungsten may require a needle-like equivalent of sharpness at a point to induce a spark. The fork-like shape is intended to induce sparking during microwave irradiation. After shaping, the metal foil may be washed or rinsed with isopropyl alcohol (IPA), ethyl alcohol, acetone, or other cleaning alcohols.

Next, the carbon source may be placed onto the metal catalyst or metal foil (Step 202). The carbon source can be loaded onto the metal catalyst and firmly pressed onto the metal catalyst surface. The catalyst can be pressed using a spatula, a utensil, by hand, by a presser or by any other method for pressing the carbon source onto the metal catalyst. In other aspects of the present disclosure the carbon source may be placed on the metal catalyst without pressing the carbon source into the metal catalyst. In additional aspects of the present invention, the carbon source may be placed underneath the metal catalyst while in the desired environment or placed near the metal catalyst. The carbon source may cover approximately ⅓ of the area of the metal foil near the fork-shape region. If the foil has a plurality of points the carbon source may be placed on some of the plurality of points, the inner points or the outer points. The carbon source may be placed on only one side of the point or on both sides of the point.

Next, the metal catalyst and carbon source may be sealed or placed in the desired environment (Step 204). For the ambient environment condition, the metal catalyst and carbon source may be simply sealed in air. For the Ar (inert) and Ar/$H_2$ (reducing) environment the samples may be placed into a glass jar or other sealed container with environment control. The environment may be adjusted utilizing the environment controls. For example, in an inert environment, ambient air may be displaced by pumping inert gas, such as Ar or N, into the sealed container, creating an inert atmosphere inside the container that will not react with other reagents. In another example, to create a reducing environment, the pressure in the ambient environment may be reduced to a certain threshold, such as 310 mbar. Reducing gas, such as Ar or Ar/$H_2$, is pumped or flows into the container to create a reducing environment. The reducing gas may flow into the container at one standard cubic foot.

Next, the metal catalyst and the carbon source may be placed in a microwave and undergo microwave irradiation converting the carbon source to the higher value material (Step 206). In some aspects of the present invention, the metal catalyst, carbon source, and the seal container are placed in the microwave. The duration of the irradiation may affect the purity or yield of the higher value material. The microwave radiation induces sparking to generate high temperature when the fork-like shape metal foils are used. The duration of the sparks may affect the purity or yield of the higher value material. The microwave radiation continues for a certain period of time beyond when the sparking stops. A high temperature is achieved by the induced sparks due to the microwave radiation illuminating on the metal catalyst. The sparking may cease due to the melt down of the pointed part of the metal foil. If the foil has a rounded shape the foil may no longer retain the ability to induce sparks after the melting process starts. The blunt shape of the foil after the melting can prevent it from further inducing sparking. The sparking may being after period of radiation treatment. The sparking continues for a period of time before ceasing. The duration of the sparking may vary. In some aspects of the present disclosure, sparking may occur between 99 seconds and 131 seconds for around 32 seconds of sparking time. Sparking usually happens within the first 180 seconds of the microwave treatment or radiation treatment after the metal is melted by the high temperature generated by the sparking.

The sparking can heat the metal catalyst to roughly 1085° C. within a few seconds. In other aspects of the present disclosure, the temperature may be higher or lower. After sparking the metal catalysts cool but may still be subjected to microwave radiation. First, the high temperature produced by sparking initiates the conversion process. The duration of the high temperature may vary. The high temperature may last just a millisecond, a second, a minute or may continue for a longer duration. The duration of the high temperature may affect the purity or yield of the higher value material. Upon sparking, the coal powder adjacent to the sparking regions gains a significant amount of thermal energy allowing for chemical bond breaking. Second, upon cooling, the catalytic role of Cu foil is essential to facilitate the formation of graphitic $sp^2$ bonding. Third, the hydrogen in reducing environment stabilizes the edge of the formed graphitic structure. And finally, the continuous microwave radiation further assists the conversion and growth in thickness through a non-thermal effect. The formation of nano-graphite (multilayer graphene) is rather peculiar. It has been widely studied and accepted that only single layer graphene will be formed on Cu foils using the catalytic chemical vapor method. This is believed to be owing to the low solubility of carbon in the Cu. The formation of the nano-graphite shown indicates that the microwave treatment may play an important role in growing multilayer graphene (nano-graphite).

Next, the higher value material may be cooled (Step 208). The cooling may occur before or after the higher value material is removed from the microwave. Next, the higher value material is removed from the metal catalyst (Step 210). Any loose powder may be removed from the metal catalyst by shaking. The higher value material may be removed through gentle scraping and sonication. The higher value material may also be removed by sonication in liquids without scraping or suitable solvents or chemical etching of the metal while the high value carbon materials remain.

Figure 1B:
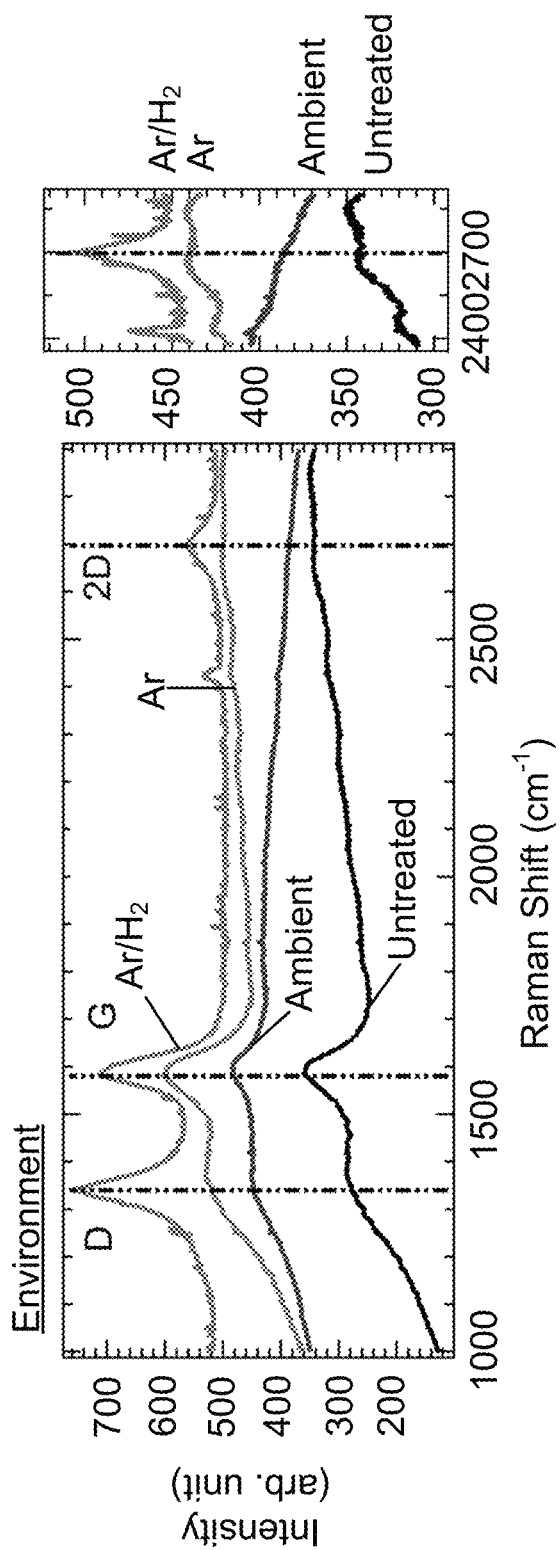
Figure 1C:
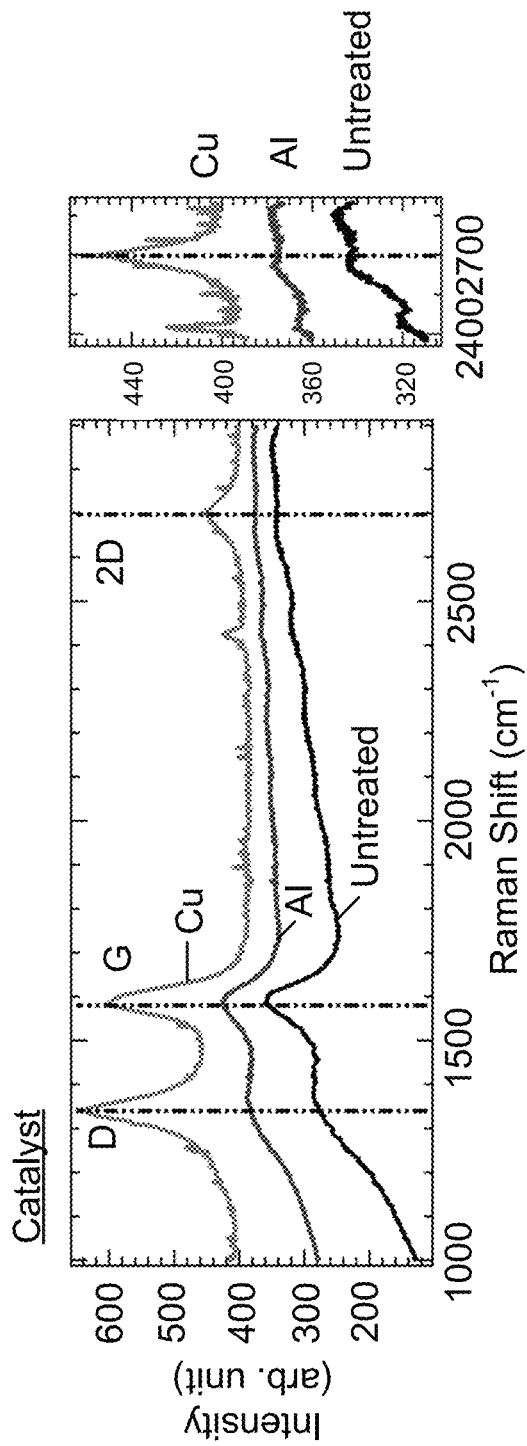

The Raman spectra taken from the untreated raw coal, and from the sample with successful conversion are displayed in each panel in FIG. 1A and FIG. 1B. Specifically, the untreated raw coal is shown as black curve, while the successful converted sample is shown as grey. The successful converted sample is also the one shown in FIG. 2A with 15 min microwave treatment, sparking induced, Cu foils, and reducing environment (Ar/$H_2$). FIG. 1A shows the Raman spectra measured on the successfully converted samples (with sparking), non-sparking samples, and untreated raw coal. For the non-sparking sample in FIG. 1A, the fork-shape Cu foil is replaced by a rectangular shaped (10 mm×20 mm) Cu foil, which does not induce sparking. In Raman spectrum, D (~1350 $cm^{-1}$) and G (~1580 $cm^{-1}$) peaks originate from the $sp^2$ carbon materials, which are expected in the coal molecules. For samples with long range order, in addition to the D and G peaks, 2D (~2700 $cm^{-1}$) and G' (~2450 $cm^{-1}$) peaks are also expected. In FIG. 1(A) the 2D peak for the non-sparking sample and the spectrum is almost identical to that of the untreated coal. High temperature produced by the sparking is one of the key ingredients for the nano-graphite conversion.

Similarly, sparking induced by microwave treatment is also necessary to convert graphene oxide (GO) into high quality graphene. In the previous work, the sparking was induced in the mildly reduced GO with a pre-annealing procedure prior to the microwave treatment. On the contrary, in this work, the coal powders with pre-annealing (300° C. for 1 h under Argon) did not exhibit sparking during the microwave irradiation. The Raman spectrum of this pre-annealed coal powders is similar to the non-sparking sample in FIG. 1A. Alternatively, in some aspects of the present disclosure, the sparking may be provided by a fork-shape metallic Cu foil. The sparking may only last for few seconds occurred within the first 180 seconds of microwave time, even the total microwave duration can be as long as 45 min.

Fe, Co, and Ni are efficient catalysts for carbon nanotube (CNT) and graphene synthesis; while Cu, Ru, Ir, and Pt can be used as catalytic substrates for graphene growth. Aluminum generally has a lack of catalytic activity for graphene growth. The Raman spectra taken on the samples treated with aluminum foil exhibit similar spectra as that of the untreated coal, as shown in FIG. 1(C). An Al foil does not facilitate the nano graphite conversion from coal powder even with the sparking and the reducing environment in some aspects of the present disclosure.

In stark contrast with other synthesis methods, such as the chemical vapor deposition method, the high temperature here is generated by sparking that occurs during microwave radiation with fork shaped metal foils. The advantage of the one step conversion is the cost effectiveness due to the low heating load. In general, the fast heating and cooling may be the key to induce the nanoparticles. Furthermore, higher temperatures may be attained with high-melting-point metal foils. It possibly widens the range of carbon materials that can be turned into higher value materials using the one step microwave radiation conversion process.

Figure 2A:
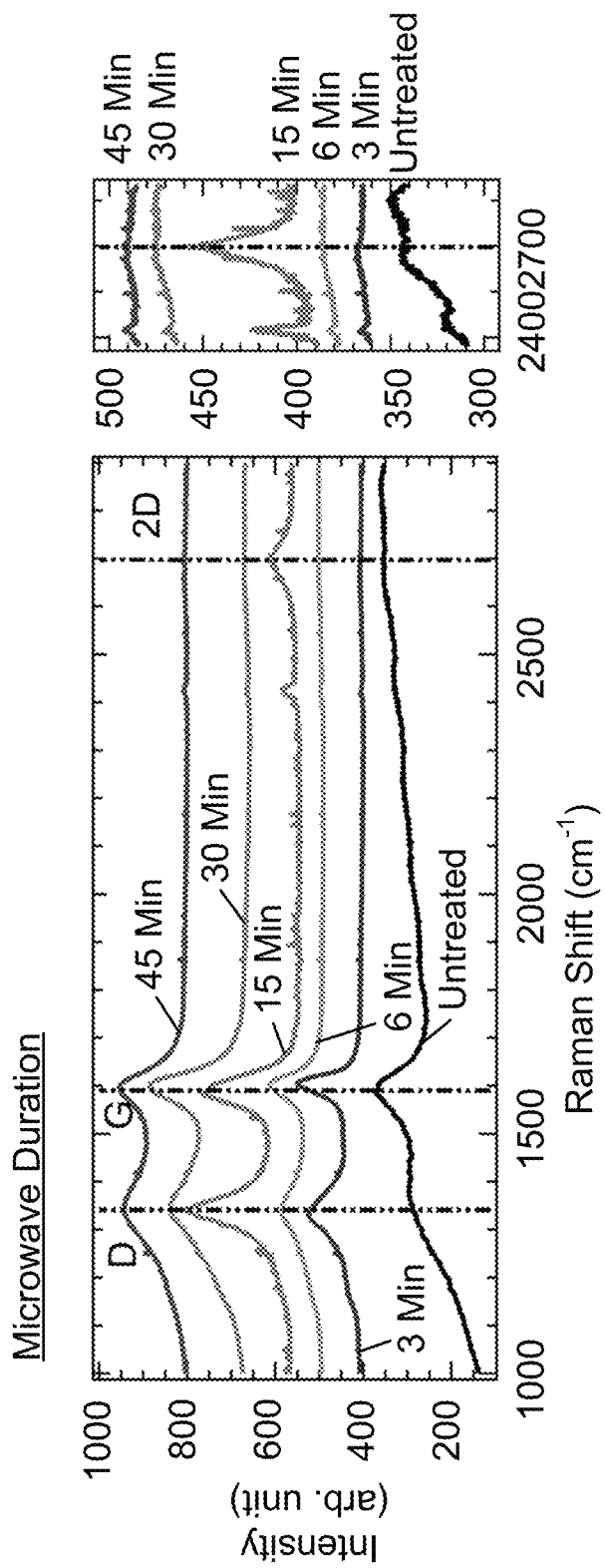
FIGS. 2A-2D provide pictorial representations for determining microwave duration effects in accordance with an exemplary aspect of the present disclosure.
Figure 2B:
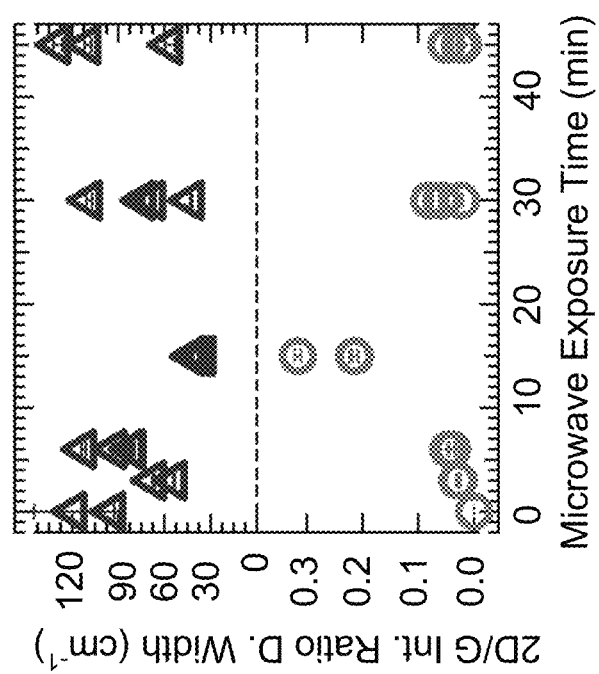
Figure 2C:
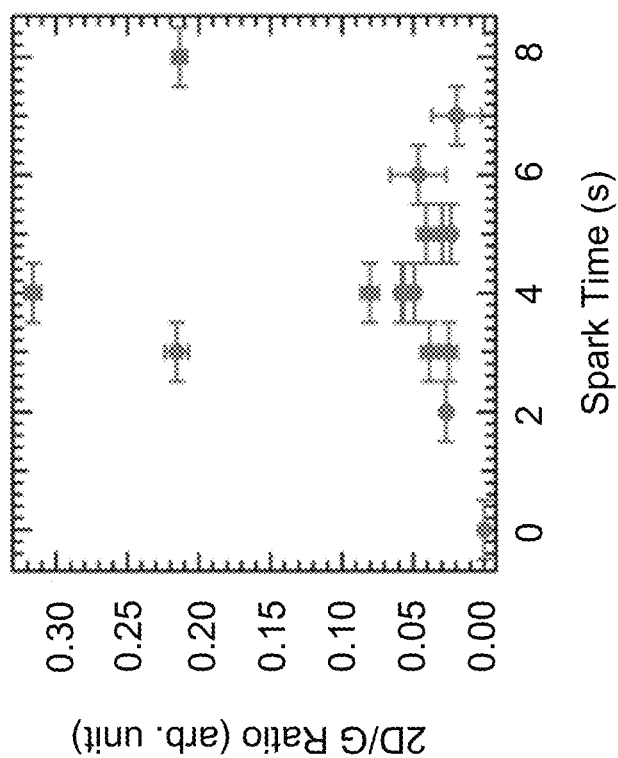
Figure 2D:
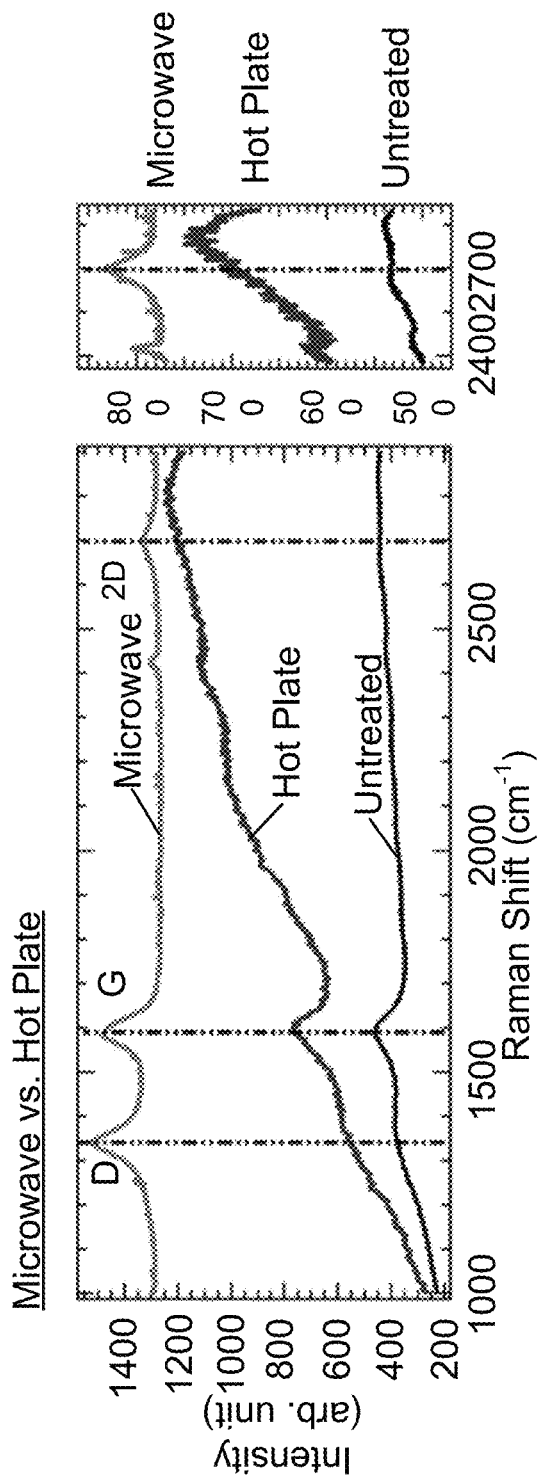

The additional factor is the microwave radiation duration. FIG. 2A provides Raman spectra of samples with various microwave exposure durations. The Raman spectra taken on samples prepared with varying microwave exposure durations (ranging from 3 to 45 min) and the different factors (sparking, type of environment, and metal catalyst) are shown in FIG. 2A. FIG. 2B provides the D peak width, 2D/G intensity ratio as function of the microwave exposure durations. FIG. 2C provides 2D/G intensity ratio as function of the sparking time. The 2D and G peaks are visible in all samples, indicating there is successful conversions. Among them, the samples treated with 15 min of microwave radiation exhibit the sharpest D peak and highest 2D/G intensity ratio, as summarized in FIG. 2B. This infers that the 15 min of microwave radiation (including the few seconds of sparking period in the first three minutes) shows significant conversion. FIG. 2C, illustrates 2D/G intensity ratio as function of the sparking time. The 2D/G intensity ratio versus sparking duration for each sample is plotted, where no correlation between the observed 2D/G ratio and the total sparking duration is observed. With these observations, in addition to the role of inducing sparking, the microwave radiation actively participates in the conversion of nano-graphite. FIG. 2D provides the Raman spectra of samples treated with 15-min microwave exposure as well as samples treated with 30 seconds of microwave exposure (with sparking) followed by 14.5-minutes 400° C. hot plate heating.

The Raman spectra of this hot plate treated sample and of the full 15-minute microwave treated sample are compared in FIG. 2D. While the sparking, reducing environment, and Cu foils are identical for the two samples, the first sample undergoes a full 15 min of microwave radiation while the second sample is exposed to 0.5 min of microwave radiation (with sparking) followed by hot plate annealed for another 14.5 min. In one aspect, the temperature due to the microwave absorption (thermal effects) in the converted coal powder cannot be measured. The maximum temperature attainable by microwave heating (2.455 GHz, 1.5 kW) for nanoscale graphite/carbon materials is only ~200-500° C. where the microwave oven used has a power of 900 W The Raman spectrum of the hot plate treated sample shows no 2D peak nor a significant change in D and G peaks compared to that of the untreated coal, indicating no significant conversion has happened. The microwave treatment in the coal-to-nano-graphite conversion has thermal effects and non-thermal effects on the chemical reactions resulting in a successful conversion.

Figure 3A:
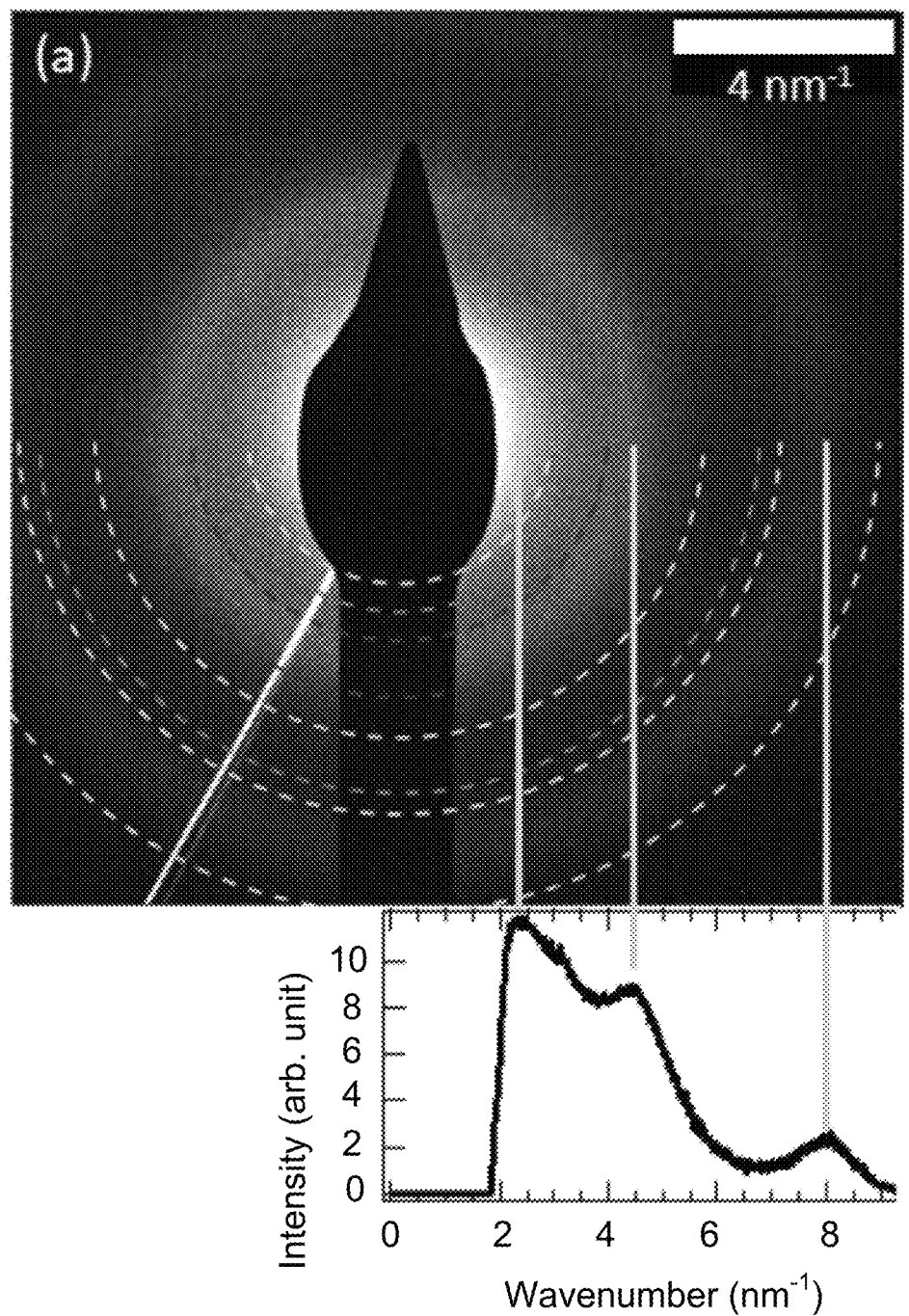
FIGS. 3A-3D provide pictorial representations of TEM images and selected area diffractions of coal derived nano-graphite in accordance with an exemplary aspect of the present disclosure.
Figure 3B:
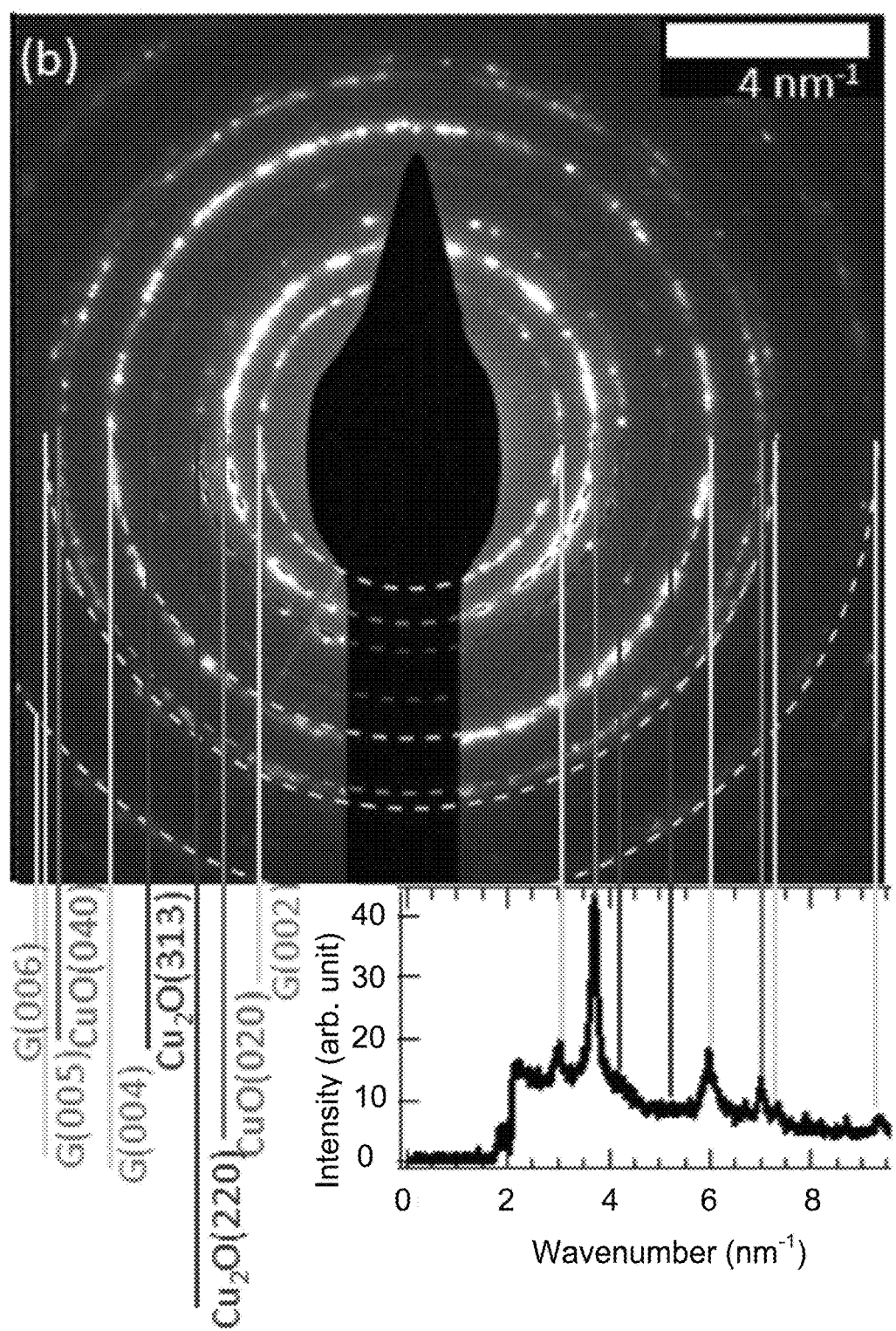
Figure 3C:
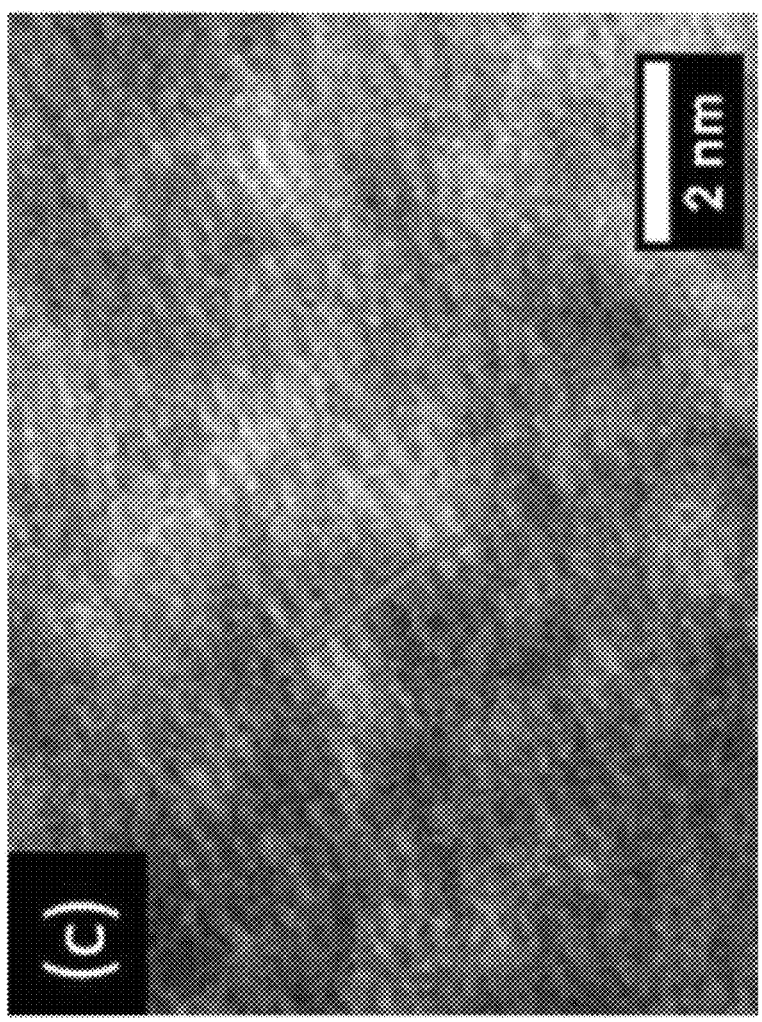
Figure 3D:
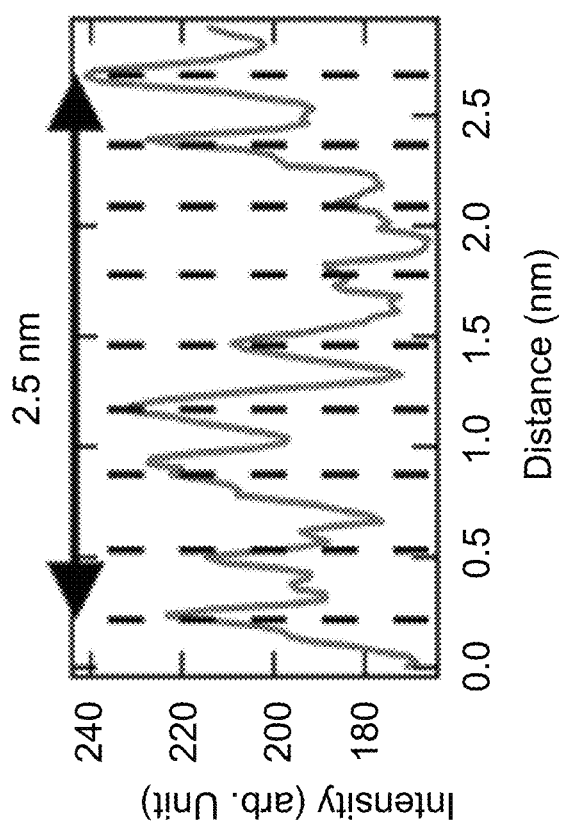
Figure 4A:
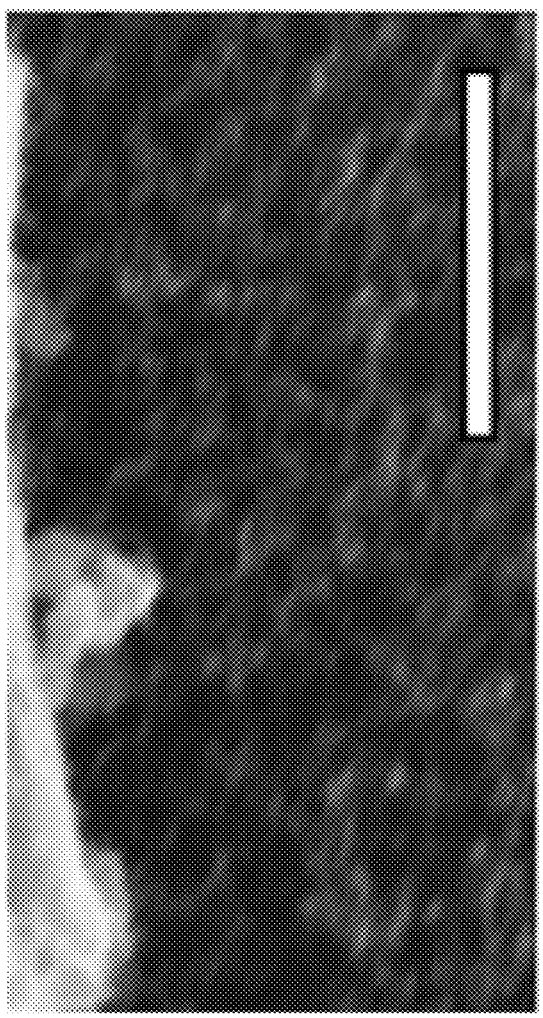
FIGS. 4A-4F provide pictorial representations of SEM images of five samples with various microwave treatment duration in accordance with an exemplary aspect of the present disclosure.
Figure 4B:
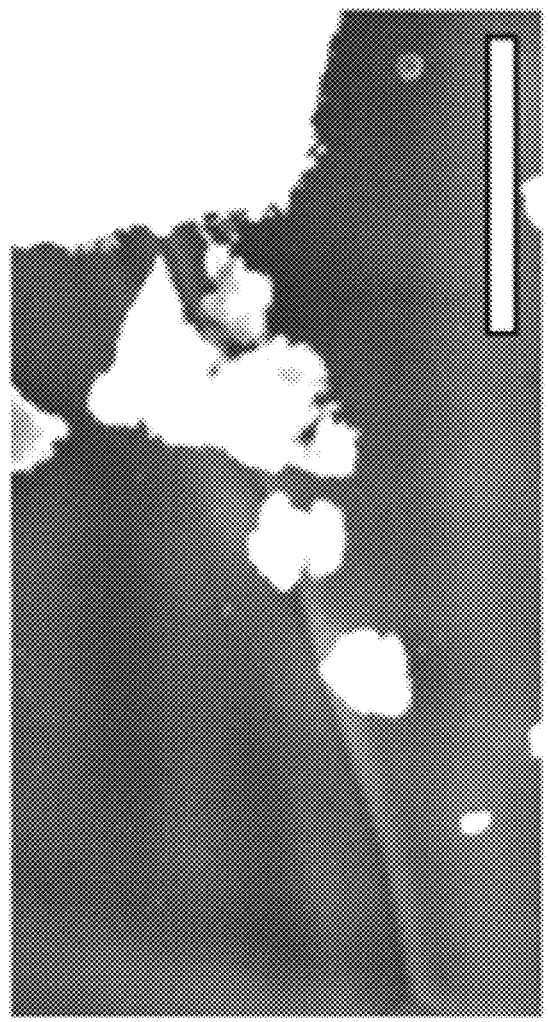
Figure 4C:
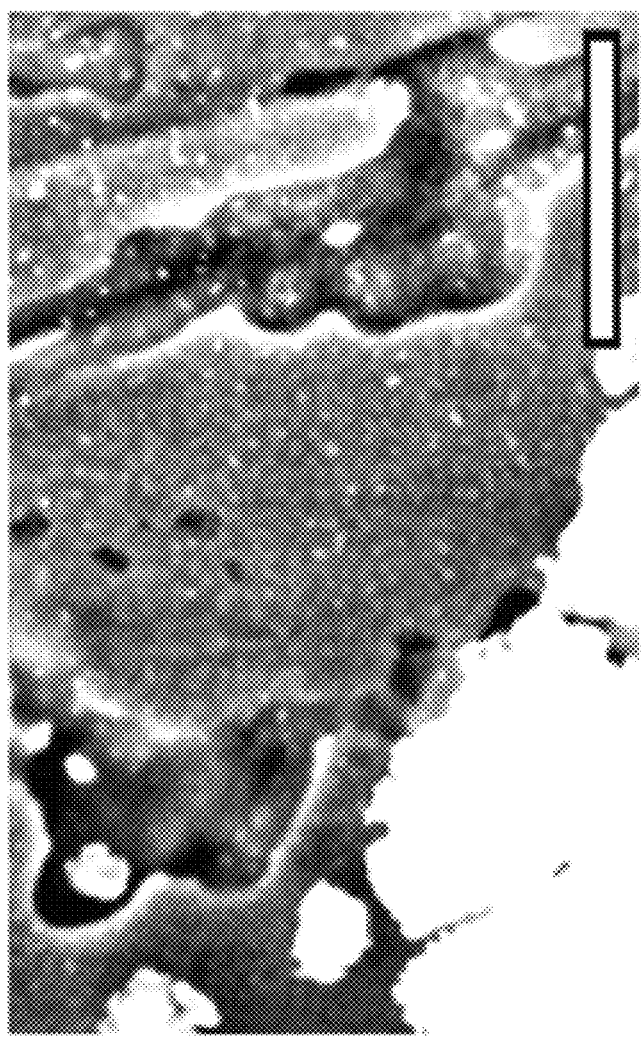
Figure 4D:
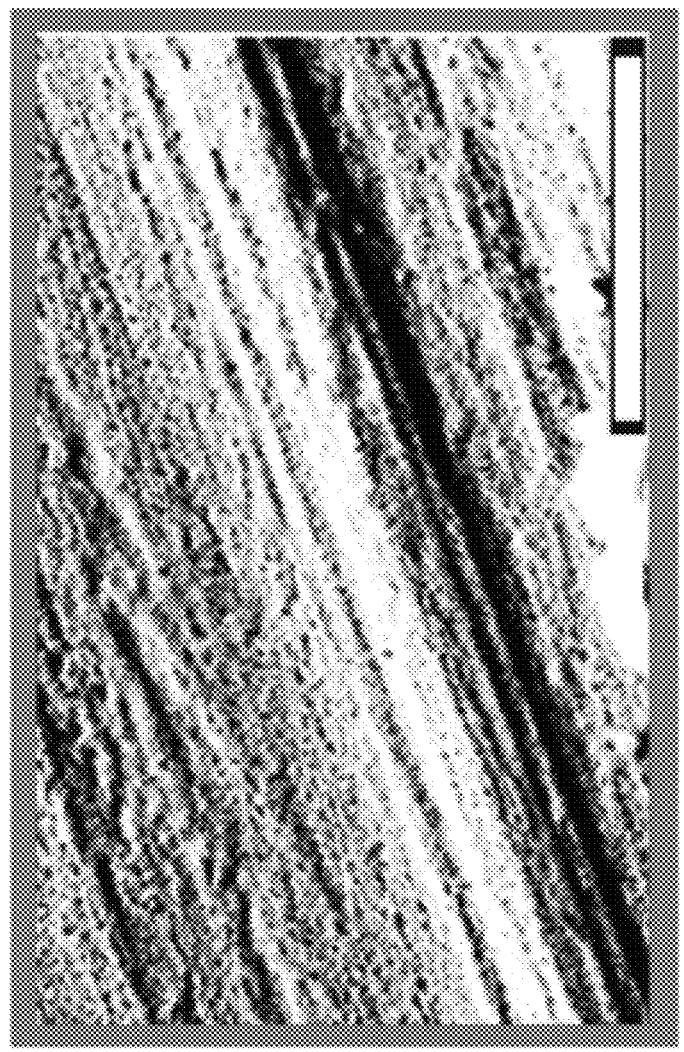
Figure 4E:
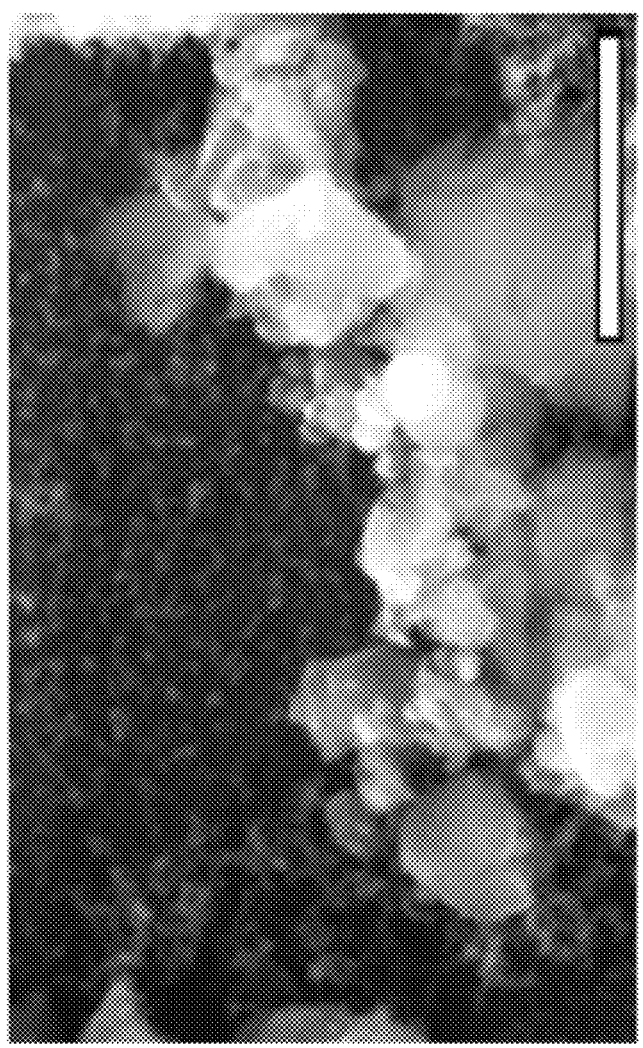
Figure 4F:
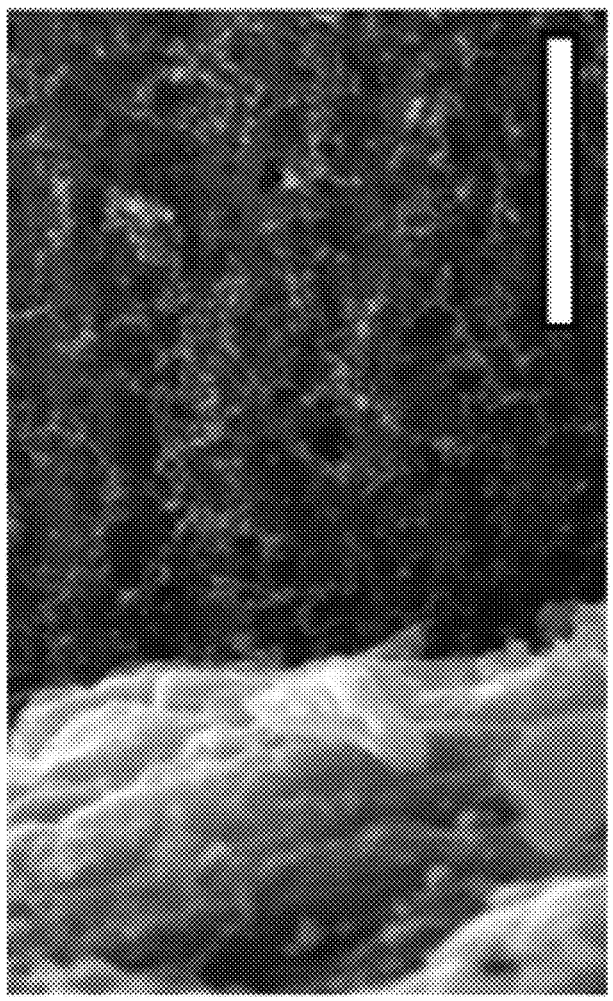

The definitive evidence of the nano-graphite conversion comes from the high-resolution TEM images and the selected area diffraction patterns. The sample used for TEM measurements is the optimally converted sample (sparking, reducing environment, a metal catalyst, and 15 min of microwave treatment). Though the coal powder was firmly pressed prior to the microwave treatment, there are loose powders after the microwave treatment. The Raman measurements presented above were measured on the metal catalyst after shaking off the loose powder. Thus, the materials of interest for TEM measurements were the materials on the metal catalyst which were removed through gentle scraping and sonication. FIGS. 3A and B are the selected area diffraction patterns measured on the raw coal powder and the crystalline regions of the converted samples. FIG. 3A provides diffraction pattern of the untreated coal with radial average beneath it. FIG. 3B provides diffraction pattern of converted coal with radial average beneath it. The ring features match well with that of graphite, CuO and $Cu_2O$. The radial average of the diffraction signal is plotted beneath the diffraction pattern for better visualization. Locations of the diffraction rings for graphite, CuO and $Cu_2O$ are added as half-rings in the diffraction images. Vertical lines correlate the peak position to the rings observed in the diffraction pattern. The untreated coal has no sharp diffraction rings owing to the lack of long-range order as shown in FIG. 3A. Also, the position of the broad peak does not match to any of the features from graphite, CuO or $Cu_2O$. On the contrary, the diffraction pattern from the successful converted sample, as shown in FIG. 3B, exhibits sharp and well-defined rings and dot-like features, which matched to the crystalline planes of graphite, CuO and $Cu_2O$. The dot-like features indicate the products are closer to the polycrystalline case. The CuO and $Cu_2O$ may be formed by either the oxygen in the raw coal or after the exposure to the air for Raman and TEM measurements. FIG. 3C shows the TEM images at the location where the selected area diffraction pattern was collected or measured. FIG. 3D provides a line profile from FIG. 3C measuring across 8 valleys for 2.5±0.2 nm results in 0.31±0.03 nm per fringe. From a line profile taken at the path indicated as the solid line in FIG. 3C, 2.5±0.2 nm was measured across eight fringes, or 0.31±0.03 nm per fringe. The results are comparable to the reported nano-graphite/Fe3O4 composited prepared from pure nano-graphite. This is corresponding to the interlayer spacing of the graphite along the c-axis, hence the nano-graphite is determined.

Successful conversion may occur only for the carbon materials directly in contact with the metal catalyst and adjacent to the sparking site. The surface morphology evolution as a function of the microwave exposure duration is measured by scanning electron microscopy (SEM), as shown in FIGS. 4A-4F. Except FIG. 4D, all of the other SEM images presented were captured near the melted regions where nano-graphite was observed in the Raman spectra and TEM images. The morphology is observed to evolve from a rough surface (3-min sample, FIG. 4A) to smooth surface (6-min sample, FIG. 4B), to a smooth, thick surface (15-min sample, FIG. 4C), and back to a rough surface (30- and 45-min samples, FIG. 4E and FIG. 4F). FIGS. 4A-4F provide pictorial representations of SEM images of five samples with various microwave treatment duration in accordance with an exemplary aspect of the present disclosure. All the SEM images were measured from the regions near the melted areas except (d), which was measured far away from the melted regions for comparison. The scale bar in each FIG. 4A-F is 5 µm. Comparing with the Raman measurements, the smooth layers seen in SEM images for 6-min and 15-min cases are directly related to the polycrystalline nano-graphite. For the locations far away from the melted regions in the 15-min sample (FIG. 4D), the rough morphology is consistent with the observation in the TEM images of the samples with low or no conversion. A carbon source that is far away from the high temperature region (melted region) does not undergo the conversion.

A metal catalyst foil, a reducing environment, and a microwave oven, produces nano-graphite material from raw coal powder or other high value materials from carbon sources. This method provides a new route to convert abundant carbon sources to high value materials with ecological and economic benefits. This method is also potentially applicable to the synthesis of the metal oxide powders. The disclosure is not to be limited to the particular aspects described herein. In particular, the disclosure contemplates numerous variations in producing nano-graphite from coal using microwave irradiation. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of aspects, processes or methods of the disclosure. It is understood that any other modifications, substitutions, and/or additions can be made, which are within the intended spirit and scope of the disclosure.

What is claimed is:

1. A method for converting a carbon source into a higher value material, the method comprising:
   shaping a metal catalyst, wherein the shape of the metal catalyst has at least one point;
   placing a carbon source onto the metal catalyst, wherein the carbon source is a carbon containing compound selected from the group consisting of coal, raw coal powder, peat, oil, diamond, carbonate sedimentary rocks, graphene oxide, methane clathrates, plastics, plastic powder, grind powder, carbon dioxide, food, insects, and waste;
   sealing the carbon source and the metal catalyst inside a container;
   microwaving the container, wherein the microwaving induces sparking at the at least one point of the metal catalyst, and wherein the microwaving increases the temperature inside of the sealed container;
   converting the carbon source into a higher value material, wherein the higher value material comprises graphite;
   cooling the metal catalyst; and
   removing the higher value material from the metal catalyst.

2. The method of claim 1, further comprising:
   a reducing environment inside the container, wherein the reducing environment comprises a reducing agent of Ar or $Ar/H_2$.

3. The method of claim 1, wherein the reducing environment inside the sealed container comprises an $Ar/H_2$ reducing environment, wherein the $H_2$ stabilizes C—H bonds at edges of graphite layers of the graphite, preventing formation of amorphous carbon.

4. The method of claim 1, wherein the metal catalyst comprises a copper metal foil.

5. The method of claim 1, wherein the carbon source is the carbon containing compound, coal in the form of ground powder pulverized powder, or finely ground sub-millimeter grains.

6. The method of claim 1, wherein the sparking occurs at the at least one point formed from shaping the metal catalyst.

7. The method of claim 1, wherein the graphite comprises polycrystalline nano-graphite.

8. A method for converting a carbon source into a higher value material, the method comprising:
   providing a metal catalyst, a sealed environment, a microwave emitter, and a carbon source;
   placing the carbon source on the metal catalyst, wherein the carbon source is in the form of ground powder, pulverized powder, or finely ground sub-millimeter grains;
   placing the carbon source and the metal catalyst in the sealed environment;
   emitting microwaves from the microwave emitter at the sealed environment;
   inducing sparking at the metal catalyst, wherein providing a high temperature by the induced sparking due to the microwaves illuminating the metal catalyst; and
   converting the carbon source into a higher value material, wherein the higher value material comprises a metal oxide or graphite.

9. The method of claim 8, further comprising:
   shaping one or more points in the metal catalyst and placing the carbon source on the metal catalyst near the one or more points of the metal catalyst, wherein sparking occurs at least at the one or more points of the metal catalyst.

10. The method of claim 8, wherein the sealed environment comprises a reducing agent of Ar or $Ar/H_2$.

11. The method of claim 8, further comprising:
    reducing a volume of the sealed environment for conversion of the carbon source.

12. The method of claim 8, further comprising:
    increasing the temperature within the sealed environment during conversion of the carbon source.

13. The method of claim 8, further comprising:
    removing the higher value material from the metal catalyst.

14. The method of claim 8, wherein the carbon source comprises coal and the metal catalyst comprises a copper metal foil.

15. The method of claim 8, further comprising:
    a reducing environment inside the sealed environment, wherein the reducing environment comprises at least one of the elements of hydrogen, lithium, sodium, potassium, rubidium, caesium, francium, beryllium, magnesium, calcium, strontium, barium, radium, helium, neon, krypton, xenon, and radon.

16. A method for converting a carbon source into a higher value material, the method comprising:
    placing a carbon source on top of a metal catalyst in an enclosed environment, wherein the carbon source is a carbon containing compound selected from the group consisting of coal, raw coal powder, peat, oil, diamond, carbonate sedimentary rocks, graphene oxide, methane clathrates, plastics, plastic powder, grind powder, carbon dioxide, food, insects, and waste;
    emitting microwaves at the enclosed environment housing the carbon source and the metal catalyst, wherein the microwave induced sparking generates a high temperature in the enclosed environment; and
    converting the carbon source into a higher value material.

17. The method of claim 16, wherein the higher value material comprises a metal oxide or graphite.

18. The method according to claim 17, wherein the graphite comprises polycrystalline nano-graphite.

19. The method of claim 16, wherein the carbon source comprises coal and the metal catalyst comprises a metal foil.

20. A method for converting plastics into crystalline graphite structures, the method comprising:
  shaping a metal catalyst to create one or more points on the metal catalyst;
  placing plastic or plastic powder on top of and in contact with the surface of the metal catalyst;
  enclosing the plastic particles and metal catalyst inside of an enclosed environment;
  placing the enclosed container inside of a microwave;
  emitting microwaves at the plastic or plastic powder and metal catalyst inside of an enclosed environment;
  inducing sparking at the one or more points of the metal catalyst with microwave emissions from the microwave in the enclosed environment; and
  converting carbon in the plastic or plastic powder into crystalline graphite structures.

21. The method of claim 20, wherein the microwave emission induced sparking generates a high temperature.

22. The method according to claim 20, wherein the crystalline graphite structures comprises polycrystalline nano-graphite.

\* \* \* \* \*